UNITED STATES PATENT OFFICE.

HENRY MATHEY, OF NEW YORK, N. Y., ASSIGNOR TO H. G. BOND, OF SAME PLACE.

MANUFACTURE OF CEMENT.

SPECIFICATION forming part of Letters Patent No. 330,602, dated November 17, 1885.

Application filed June 29, 1885. Serial No. 170,116. (No specimens.)

*To all whom it may concern:*

Be it known that I, HENRY MATHEY, a citizen of the United States, residing at New York, in the county of New York and State of New York, have invented certain new and useful Improvements in the Manufacture of Cement, of which the following is a specification.

My invention relates to improvements in the manufacture of hydraulic cement. The higher grade cements—such as the English Portland, the French Boulogne, and the Belgian and German cements—have been found to stand greater tensile and breaking strains than the ordinary standard cements. These foreign cements are usually made in the following manner: The different elements composing the cements (the most important being lime, silica, and alumina) are mixed up in their proper proportions into a wet and pasty state under vertical mullers. This mass, which is thus rendered fine and homogeneous, is subsequently made into forms or bricks, which are burned in a Portland-cement kiln. After calcination the cement is pulverized and barreled for commerce. This method of burning permits considerable ashes and unburned coal to be intimately mixed with the cement, and, moreover, it is apparent that such a process is expensive.

By my process the "slip" or wet mass, the formation of the bricks, and the admixture and pulverization of the products of combustion just described are dispensed with.

To attain the objects sought for by my process, the different raw elements required for a No. 1 cement are first ground in their proper proportions to a fine powder, (impalpable, or nearly so,) and this powder is then fed into a calcining apparatus, (having a regular and constant discharge,) where it is subjected to a high heat. For this purpose I prefer a furnace such as shown in my patent for revolving furnace, granted September 1, 1885, and numbered 325,259. The material being minutely divided is uniformly exposed to the heat, and is burned regularly. The different reactions which occur during the burning take place rapidly, and a perfect cement is quickly and economically formed. The cement as it is discharged from the calcining apparatus is cooled and barreled without further pulverization. In my application, now pending, filed March 18, 1885, No. 159,309, the cement, rock is first crushed, then burned, and, thirdly, pulverized. Thus it will be seen that in the present application I have dispensed with one extra and expensive step by pulverizing the material in the first instance. By reason of this first and fine pulverization perfect calcination and the discharge of the calcined material can be more rapid, and the amount of material treated be greatly increased for a given amount of fuel.

Having thus described my invention, what I claim is—

The process of making hydraulic cement, which consists in first grinding the cement rock or material to a fine powder and then calcining this powder, substantially as and for the purpose set forth.

In testimony whereof I affix my signature in presence of two witnesses.

HENRY MATHEY.

Witnesses:
EMMA M. GILLETT,
NEWTON B. LOVEJOY.